(12) United States Patent
Yang et al.

(10) Patent No.: US 11,841,022 B2
(45) Date of Patent: Dec. 12, 2023

(54) CONTROL SYSTEM FOR ELECTRIC FLUID MOVING APPARATUS

(71) Applicant: Regal Beloit America, Inc., Beloit, WI (US)

(72) Inventors: Bin Yang, Fort Wayne, IN (US); Brian L. Beifus, Fort Wayne, IN (US); Roger C. Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 404 days.

(21) Appl. No.: 16/735,257

(22) Filed: Jan. 6, 2020

(65) Prior Publication Data

US 2021/0207612 A1 Jul. 8, 2021

(51) Int. Cl.
*F04D 27/00* (2006.01)
*F04D 25/06* (2006.01)
*G05D 7/06* (2006.01)

(52) U.S. Cl.
CPC ........... *F04D 27/004* (2013.01); *F04D 25/06* (2013.01); *G05D 7/0676* (2013.01)

(58) Field of Classification Search
CPC ........ F04D 27/004; F04D 27/00; F04D 25/06; F04D 15/0066; G05D 7/0676;

(Continued)

(56) References Cited

U.S. PATENT DOCUMENTS 4,927,328 A 5/1990 Scoates et al.
5,736,823 A * 4/1998 Nordby ................... F04D 27/00
388/930

(Continued)

FOREIGN PATENT DOCUMENTS

CN 101334745 A 12/2008
CN 105531922 A 4/2016
WO 2018226973 A1 12/2018

OTHER PUBLICATIONS

International Search Report and Written Opinion for International Patent Application No. PCT/US2020/012582, dated Mar. 25, 2020, 10 pages.

(Continued)

*Primary Examiner* — Kenneth J Hansen
*Assistant Examiner* — David N Brandt
(74) *Attorney, Agent, or Firm* — Armstrong Teasdale LLP (57) ABSTRACT

A control system is provided for an electric motor configured to drive a fluid moving apparatus to generate a fluid-flow. The control system includes a drive circuit configured to regulate power supplied to a stator of the motor to turn a rotor and generate the fluid-flow, and a processor that computes a value proportional to at least one of a system resistance or a static pressure for the fluid moving apparatus based on a fixed set point for a first control parameter and a feedback parameter. The processor receives a fluid-flow rate demand and computes an operating set point for a second control parameter based on the fluid-flow rate demand and the value proportional to the system resistance or the static pressure. The processor controls the drive circuit based on the operating set point to supply power to the motor and operate the fluid moving apparatus to generate the fluid-flow.

19 Claims, 5 Drawing Sheets

(58) Field of Classification Search
CPC ............... Y02B 30/70; F05D 2270/301; F05D 2270/304; F05D 2270/335
USPC .................................................. 417/44.1, 45
See application file for complete search history.

(56) References Cited

U.S. PATENT DOCUMENTS

| | | |
|---|---|---|
| 6,994,620 B2 | 2/2006 | Mills |
| 7,567,049 B2 | 7/2009 | Shahi et al. |
| 8,408,878 B2 | 4/2013 | Shahi et al. |
| 9,200,995 B2 | 12/2015 | Ahola et al. |
| 9,631,830 B2 | 4/2017 | Sasaki et al. |
| 9,732,976 B2 | 8/2017 | Wang et al. |
| 2005/0159845 A1 | 7/2005 | Malone et al. |
| 2005/0247194 A1 | 11/2005 | Kang et al. |
| 2006/0265890 A1* | 11/2006 | Solan, Jr. ................. H02P 6/30 33/320 |
| 2008/0095638 A1* | 4/2008 | Branecky ............. H02P 29/024 417/43 |
| 2009/0247064 A1 | 10/2009 | Chen |
| 2010/0101265 A1* | 4/2010 | Yokouchi ............. F04D 27/004 700/275 |
| 2012/0112679 A1* | 5/2012 | Tang ........................ H02P 6/06 318/494 |
| 2012/0171050 A1 | 7/2012 | Harvard, Jr. |
| 2012/0212166 A1 | 8/2012 | Merkel et al. |
| 2015/0064023 A1 | 3/2015 | Sasaki et al. |

OTHER PUBLICATIONS

Chinese Office Action and Search Report issued in Chinese Application No. 202080019130.3, dated May 11, 2022, with English translation, 18 pages.

* cited by examiner

CONTROL SYSTEM FOR ELECTRIC FLUID MOVING APPARATUS

BACKGROUND

The field of the disclosure relates generally to a control system for electric motors and, more specifically, a control system that enables approximately constant fluid-flow production from a fluid moving apparatus.

At least some electric motors are torque-calibrated when manufactured to ensure the torque output at the drive shaft of the electric motor matches the torque commanded. At least some electric motors, particularly electric motors driving blowers, such as a forward-curved blower, are further calibrated to produce an approximately constant fluid-flow or, more specifically, airflow during operation in either a torque-control mode or a speed-control mode. Such a calibration, or characterization, quantizes airflow output for a given speed and torque output when driving the blower. The actual airflow output can vary according to the blower construction or duct, space, or other airflow restriction, into which the airflow is directed.

Constant fluid-flow heating, ventilation, and air conditioning (HVAC) systems improve thermal comfort and energy savings. Constant fluid-flow systems may also be used in certain refrigeration systems or pumping systems. In a constant fluid-flow system, a control system for an electric blower motor receives a fluid-flow rate demand, e.g., a value in cubic feet per minute (CFM), and then determines, e.g., by a polynomial or constant fluid-flow algorithm, an appropriate motor torque or motor speed to produce approximately the fluid-flow demanded. In a torque-controlled implementation, for example, motor torque is regulated based on a monitored motor speed to produce the approximate fluid-flow.

It is desirable to utilize a backward-curved, or backward-inclined, electric blower in constant fluid-flow HVAC systems to improve efficiency of the electric blower. Backward-curved blowers generally produce a given fluid-flow at a higher speed and with reduced power relative to radial or forward-curved counterparts. However, such backward-curved blowers may produce multiple different fluid-flows when operated at a given torque and speed, particularly at in certain operating ranges, such as at high fluid flows. Likewise, it is desirable to operate other fluid moving apparatuses, such as, for example, compressors, fans (e.g., axial fans, vane-axial fans, mix flow fans, dual stage axial flow fans, tube axial fans, multi-stage axial fans, or any other type of fan), impellers, and pumps, to produce an approximately constant fluid-flow. Consequently, a control system using known constant fluid-flow algorithms cannot effectively operate a backward-curved electric blower or certain types of fans and compressors to produce a demanded fluid-flow by operating in a traditional torque-control or speed-control mode. A control system that overcomes this limitation for backward-curved electric blowers, compressors, and certain types of fans is desired.

BRIEF DESCRIPTION

One aspect of the disclosure includes a control system for an electric motor configured to drive a fluid-moving apparatus to generate a fluid-flow. The control system includes a drive circuit configured to regulate electrical power supplied to a stator of the electric motor to turn a rotor of the electric motor and generate the fluid-flow. The control system includes a processor coupled to the drive circuit and configured to compute a value proportional to at least one of a system resistance or a static pressure for the fluid-moving apparatus based on a fixed set point for a first control parameter and a feedback parameter. The processor is configured to receive a fluid-flow rate demand value and compute an operating set point for a second control parameter based on the fluid-flow rate demand value and the value proportional to the at least one of the system resistance or the static pressure. The processor is configured to control the drive circuit based on the operating set point to supply electrical power to the electric motor and to operate the fluid-moving apparatus to generate the fluid-flow.

Another aspect of the disclosure includes a constant fluid-flow system, including a fluid moving apparatus, an electric motor, and a control system. The electric motor is coupled to and configured to drive the fluid moving apparatus to generate an airflow into an output path, the electric motor including a stator and a rotor coupled to the fluid moving apparatus. The control system includes a drive circuit configured to regulate electrical power supplied to the stator to turn the rotor and the fluid moving apparatus to generate the fluid-flow, and a processor. The processor is configured to compute a value proportional to at least one of a system resistance or a static pressure for the output path. The processor is configured to receive a fluid-flow rate demand value and compute an operating set point for a control parameter based on the fluid-flow rate demand value and the value proportional to the at least one of the system resistance or the static pressure. The processor is configured to control the drive circuit based on the operating set point to supply electrical power to the electric motor and to operate the fluid moving apparatus to generate the fluid-flow.

Yet another aspect of the disclosure includes a method of operating an electric motor configured to drive a fluid-moving apparatus to generate a fluid-flow. The method includes controlling a drive circuit based on a fixed set point for a first control parameter to supply electrical power to the electric motor and to operate the fluid-moving apparatus. The method includes determining a feedback parameter corresponding to the fixed set point, and computing a value proportional to at least one of a system resistance or a static pressure for the fluid-moving apparatus based on the first control parameter and the feedback parameter. The method includes receiving a fluid-flow rate demand value. The method includes computing an operating set point for a second control parameter based on the fluid-flow rate demand value and the value proportional to the at least one of the system resistance or the static pressure. The method includes controlling the drive circuit based on the operating set point to supply electrical power to the electric motor and to operate the fluid-moving apparatus to generate the fluid-flow.

In one aspect, a motor controller for an electric motor configured to drive a blower to generate an airflow is provided. The motor controller includes a drive circuit and a processor. The drive circuit is configured to regulate electrical power supplied to a stator of the electric motor to turn a rotor of the electric motor and generate the airflow. The processor is coupled to the drive circuit and is configured to compute a system resistance for the blower based on a fixed set point for a first control parameter and a feedback parameter. The processor is configured to receive an airflow rate demand value and compute an operating set point for a second control parameter based on the system resistance and the airflow rate demand value. The processor is configured to control the drive circuit based on the operating set point to supply electrical power to the electric motor and to operate the blower to generate the airflow.

In another aspect, a method of operating an electric motor configured to drive a blower to generate an airflow. The method includes controlling a drive circuit based on a fixed set point for a first control parameter to supply electrical power to the electric motor and to operate the blower. The method includes determining a feedback parameter corresponding to the fixed set point. The method includes determining an airflow value corresponding to the first control parameter and the feedback parameter. The method includes computing a system resistance for the blower based on the first control parameter and the feedback parameter. The method includes receiving an airflow rate demand value. The method includes computing an operating set point for a second control parameter based on the system resistance and the airflow rate demand value. The method includes controlling the drive circuit based on the operating set point to supply electrical power to the electric motor and to operate the blower to generate the airflow.

In yet another aspect, a constant airflow system is provided. The constant airflow system includes a blower, an electric motor, and a motor controller. The electric motor is coupled to and configured to drive the blower to generate an airflow. The electric motor includes a stator and a rotor coupled to the blower. The motor controller includes a drive circuit configured to regulate electrical power supplied to the stator to turn the rotor and the blower to generate the airflow. The motor controller includes a processor configured to compute a system resistance for the duct. The processor is configured to receive an airflow rate demand value. The processor is configured to compute an operating set point for a control parameter based on the system resistance and the airflow rate demand value. The processor is configured to control the drive circuit based on the operating set point to supply electrical power to the electric motor and to operate the blower to generate the airflow.

DETAILED DESCRIPTION

Embodiments of the control system and methods of operating an electric motor for a constant fluid-flow system described herein provide improved characterization of the constant fluid-flow system based on motor torque, motor speed, fluid-flow, system resistance, and static pressure, and/or values proportional thereto. The improved characterization enables constant fluid-flow production using a fluid moving apparatus, or fluid mover, such as, for example, a backward-curved electric blower, a compressor, an impeller, or a fan (e.g., a vane-axial fan), while maintaining the benefits of such fluid moving apparatus, for example, the benefits of a backward-curved electric blower over a radial or forward-curved blower, namely the improved efficiency and greater pressure generation. The improved characterization also enables constant fluid-flow production using, for example, a forward-curved electric blower or a radial electric blower.

The control system, as described herein, performs this characterization based on a correlation between speed or torque and fluid-flow to compute a static pressure and/or system resistance, or a value proportional thereto. As such, the control system may operate without sensors (e.g., may be a "sensorless" control system). Moreover, this characterization is generally universally applicable (e.g., to forward-curved blowers, backward-curved blowers, vane axial fans, etc.) because the characterization employs the above-described correlation to identify a static pressure and/or system resistance to maintain the desired fluid-flow. These relationships or correlations are apparatus-agnostic, and, as such, may be applied to any fluid moving apparatus.

As used herein, "fluid moving apparatus" or "fluid mover" may include any fluid moving apparatus, such as, but not limited to, compressors, blowers, fans (e.g., axial fans, vane-axial fans, mix flow fans, dual stage axial flow fans, tube axial fans, multi-stage axial fans, or any other type of fan), impellers, and pumps. "Air moving apparatus" or "air mover" may more specifically include, for example, blowers and/or fans. It should be readily understood that "air" may refer to any gaseous fluid.

Embodiments of the control system and methods described herein characterize the constant fluid-flow system utilizing, for example, correlations among torque (T), speed (N), demanded fluid-flow (Q), and system resistance (R). More specifically, the constant fluid-flow system may be characterized by a fluid-flow algorithm, or "torque correlation," that defines, for example, torque (T) as a function of speed (N) and demanded fluid-flow (Q). In alternative embodiments, the constant fluid-flow system is characterized by a "speed correlation" that defines speed (N) as a function of torque (T) and demanded fluid-flow (Q). The constant fluid-flow system is further characterized by its system resistance (R) defined as a function of demanded fluid-flow (Q), speed (N), and a static pressure (P) generated by the fluid moving apparatus. In alternative embodiments, system resistance (R) may be defined as a function of any two or more of demanded fluid-flow (Q), torque (T), speed (N), or static pressure (P). Likewise, in certain embodiments, because static pressure may be defined in terms of demanded fluid-flow (Q) and one or both of torque (T) and speed (N), or defined as a function of torque (T) and speed (N), system resistance may be defined simply as a function of demanded fluid-flow (Q) and one or both of torque (T) and speed (N). Using these correlations, together referred to as the "constant fluid-flow algorithm," a fluid moving apparatus, or fluid mover, such as, for example, a backward-curved, forward-curved, or radial electric blower motor, a compressor, an impeller, or a fan such as an axial or vane-axial fan can be operated in a torque control mode, a speed control mode, or both to produce an approximately constant fluid-flow from the fluid mover.

In alternative embodiments, the electric motor may be characterized utilizing correlations among torque (T) or speed (N) and one or more of power input to the electric motor, current supplied to the electric motor, power output at the drive shaft of the motor, motor efficiency, or power output from the fluid mover itself, i.e, fluid power. For example, power output at the drive shaft is correlated to torque (T) and speed (N), i.e., $P_{shaft}=TN$, as well as to power input to the electric motor and motor efficiency, i.e., $P_{in}=P_{shaft}$/motor efficiency. Moreover, power input to the electric motor is a function of voltage and current supplied to the stator windings of the electric motor, i.e., $P_{in}=VI$.

In certain embodiments, the constant fluid-flow system is first characterized to determine a set of constants for a fluid-flow algorithm. In one embodiment, the fluid mover, e.g., a backward-curved blower, vane axial fan, etc., is operated at a constant torque, e.g., 20%, and speed is measured to produce a torque-speed pair from which a torque-speed-fluid-flow data point can be computed using a fluid-flow algorithm, or "torque correlation," e.g., $T=f(Q,N)$, similar in form to a traditional constant fluid-flow algorithm for a forward-curved blower, for example. For example, the fluid-flow algorithm may take the following form:

$$T = k_1NQ + k_2Q^2 + k_3N + k_4N^2 + k_5, \quad \text{EQ. 1}$$

where, $k_1$, $k_2$, $k_3$, $k_4$, $k_5$ are constants. Generally, the constants are predetermined for the fluid mover prior to installation.

In a torque-controlled implementation, for example, the characterization embodied in the control system and methods described herein produces one or more torque-speed-fluid-flow data points that characterize the operating profile of the constant fluid-flow system. That operating profile is then approximated by a polynomial, fluid-flow algorithm, or formula that defines motor torque (T) as a function of motor speed (N) and fluid-flow rate demand (Q). Likewise, in a speed-controlled implementation, for example, the characterization embodied in the control system and methods described herein again operates the fluid mover at a fixed speed, e.g., 20%, which produces one or more torque-speed-fluid-flow data points that characterize the operating profile of the constant fluid-flow system. That operating profile is then approximated by a polynomial, fluid-flow algorithm, or formula, that defines motor speed (N) as a function of motor torque (T) and fluid-flow rate demand (Q). In an alternative speed-controlled embodiment, the formula for motor torque (T) described above may be used to compare a computed torque to a torque value in a speed-torque pair for the desired motor speed (N). A torque error value resulting from the comparison may then be used to drive the motor speed (N) to a target, or objective, value. In another alternative embodiment, motor power may be defined as a function of motor speed (N), motor torque (T), and fluid-flow rate demand (Q). In either embodiment, the characterization described herein yields values for various coefficients that scale the various algebraic terms of the polynomial. The polynomial is sometimes referred to as a constant fluid-flow algorithm. However, it is generally understood the actual fluid-flow produced by such a constant fluid-flow system using a constant fluid-flow algorithm only approximates the demanded fluid-flow due to numerous sources of error and variabilities in environmental and physical properties of the constant fluid-flow system and the path, duct, or space into which the fluid-flow is directed.

Generally, a fluid-flow algorithm having more terms produces a finer fit to the data collected during characterization and, therefore, yields more accurate estimates of actual fluid-flow. The fit of a given fluid-flow algorithm may be further improved by enabling non-integer (e.g., real number) values for one or more coefficients or exponents. Consequently, electric motors and motor controllers must have sufficient processors, memory, communication interfaces, and software to program, store, recall, and execute such fluid-flow algorithms. Moreover, a greater number of terms and non-integer coefficients in the fluid-flow algorithm generally correlates to heavier computation loads in deriving the necessary coefficients. Generally, another consequence of utilizing more terms to produce a finer fit to the data collected during characterization, is that any gaps in the data, e.g., under-sampling, or outlier data points are captured in the resulting surface, giving the resulting surface undesirable contours, or possibly poles, that, accordingly, produce inaccurate fluid-flow during operation, particularly at extrema of the operating profile of the electric motor and fluid mover. Conversely, with fewer terms and a coarser fit to the data, the regression analysis tends to "filter," or "smooth," gaps in the data and outlier data points, thereby producing a surface having gentler contours and more accurate fluid-flow production at extrema of the operating profile.

However, the fluid-flow algorithm, or torque correlation, alone is generally insufficient to operate, for example, a backward-curved electric blower or certain compressors, impellers, or fans to produce a constant fluid-flow over the full operating profile, because, as explained above, multiple fluid-flow values correspond to a given torque-speed pair in certain regions of the operating profile, e.g., for high-volume fluid-flows. To overcome this limitation of the fluid-flow algorithm, the constant fluid-flow system is further characterized by its system resistance (R). Using the torque-speed-fluid-flow data point, the system resistance (R) is computed as a function of demanded fluid-flow (Q) and static pressure (P) generated by the fluid mover. In alternative embodiments, system resistance (R) is computed as a function of torque (T) and speed (N). Generally, at a given steady operating point for the fluid mover, producing a given demanded fluid-flow (Q), the static pressure (P) it generates is related to the system resistance into which the fluid-flow is produced by the equation:

$$P=RQ^2. \quad \text{EQ. 2}$$

Accordingly, given a static pressure (P) generated by the fluid mover and the corresponding demanded fluid-flow (Q), the system resistance (R) can be computed.

In certain embodiments, the static pressure (P) may be expressed as a function of speed (N) and fluid-flow (Q). The function is referred to as a static pressure correlation and is approximated by a polynomial or formula defined in terms of speed (N), demanded fluid-flow (Q), and one or more constants. For example, the static pressure correlation may take the following form:

$$P = a_1 c_1^2 N^2 - a_2 \frac{c_2^2}{c_1^2} \frac{Q}{N} + (c_3 Q^2 + c_4 Q + c_5)\left(1 + a_3 \frac{c_2}{c_1^2} \frac{Q}{N}\right), \quad \text{EQ. 3}$$

where, $a_1$, $a_2$, $a_3$ are coefficients, and $c_1$, $c_2$, $c_3$, $c_4$, $c_5$ are constants. In one embodiment, the coefficients are defined as $a_1=4.3865\times10^3$, $a_2=0.010132$, $a_3=1.5198178$. Generally, the coefficients and constants are predetermined for the fluid mover prior to installation. In alternative embodiments, static pressure (P) may be expressed as a function of torque (T) and fluid-flow (Q).

Accordingly, given the torque-speed-fluid-flow data point described above, a static pressure or static pressure demand value (P), or a parameter proportional thereto, is computed, which enables computation, or characterization, of the system resistance (R), or a parameter proportional thereto. When a new fluid-flow (Q) is demanded, EQ. 2 enables computation of a necessary static pressure (P) to be generated by the fluid mover to produce the new fluid-flow (Q) for the given system resistance (R). Given the value of the necessary static pressure (P) and the new fluid-flow (Q), the static pressure correlation (EQ. 3) enables computation of a necessary speed (N) to produce that static pressure (P) and new fluid-flow (Q). The combination of EQS. 1-3 described above are referred to as the constant fluid-flow algorithm for the fluid mover. The control system then operates the electric motor (e.g., using a motor controller) in a speed-controlled mode, at that speed (N) to produce an approximately constant fluid-flow. Alternatively, the control system may use the speed (N) and fluid-flow (Q) to compute a torque (T) for operating the electric motor in a torque-controlled mode. In alternative embodiments, the constant fluid-flow algorithm can be formed from a combination of two or more correlations (i.e., formula, equations, or polynomials) among speed (N), torque (T), fluid-flow (Q), system resistance (R), or static pressure (P). For example, the constant fluid-flow algorithm may be formed from a combination of torque (T) expressed as a function of speed (N) and fluid-flow (Q), and system resistance (R) expressed as a function of speed (N) and fluid-flow (Q). In another example, the constant fluid-flow algorithm may be formed from a combination of system resistance (R) expressed as a function of speed (N) and torque (T), and system resistance (R) expressed as a function of fluid-flow (Q) and torque (T).

In many constant fluid-flow systems, the system resistance is generally considered constant over a period of time. In practice, that system resistance may shift over time, for example, due to dirt, dust, or other contamination buildup on the a filter or other changing components of the system, path, or space into which the fluid-flow is directed. In other systems, the system resistance is controllable, for example, by configuring dampers, louvres, ducts, or vents to increase or decrease the resistance of the system to the fluid-flow. In such systems, the control system detects a change in system resistance (R) and adjusts the operating point accordingly.

For example, when operating in a speed-controlled mode and the system resistance (R) increases, the motor controller detects a change in torque output of the electric motor. This new torque-speed pair results in a recalculation of the system resistance (R) using the torque correlation (EQ. 1) and static pressure correlation (EQ. 3). Given the increased system resistance (R) and the demanded fluid-flow (Q), a new speed (N) is computed and the operating point of the electric motor is adjusted. This procedure iterates until the system converges on a stable operating point for the increased system resistance (R).

Figure 1:
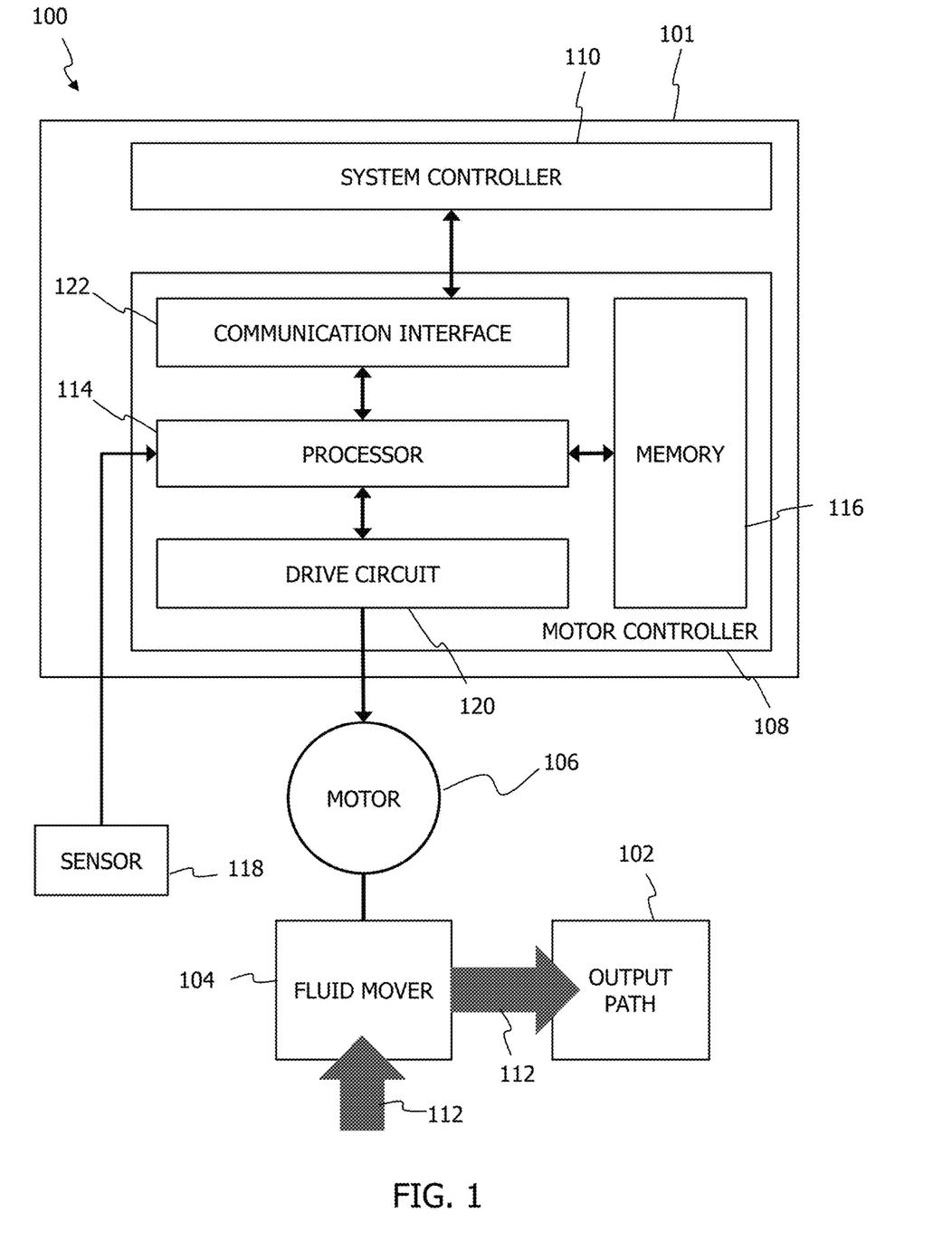
FIG. 1 is a block diagram of an exemplary constant fluid-flow system.

FIG. 1 is a block diagram of a constant fluid-flow system 100. Constant fluid-flow system 100 includes a control system 101, an output path 102, a fluid mover 104, and an electric motor 106. Control system 101 includes a motor controller 108, and a system controller 110. In other embodiments, constant fluid-flow system 100 may include additional, fewer, or alternative components, including those described elsewhere herein. For example, fluid mover 104 may be configured to generate a fluid-flow into a space other than a defined duct, plenum, or other output path.

Fluid mover 104 is configured to generate a fluid-flow 112 directed through output path 102. Output path 102 is configured to guide the fluid-flow for circulation and distribution within a system, building, vehicle, or other structure. Output path 102, or alternatively the space into which fluid-flow 112 is directed, has a fluid-flow restriction, or system resistance (R), that affects the fluid-flow output from fluid mover 104. The fluid-flow restriction is based on various parameters that may affect fluid-flow within constant fluid-flow system 100, such as, but not limited to, the internal dimensions of output path 102, open or closed dampers, contaminants (e.g., dust) within output path 102, the geometry of output path 102, or alternatively the space into which fluid-flow 112 is directed, and the like.

Electric motor 106 is configured to drive fluid mover 104 to generate the fluid-flow 112 into output path 102. In at least some embodiments, electric motor 106 is an induction motor configured to convert electrical power into mechanical power. In alternative embodiments, electric motor 106 is a permanent magnet motor. In one example, electric motor 106 is coupled to a wheel (not shown) of fluid mover 104 and is configured to rotate the wheel. In the exemplary embodiment, electric motor 106 is configured to operate at a plurality of torque output levels (i.e., torque-controlled) to increase or decrease a corresponding motor speed. Increasing or decreasing the motor speed of electric motor 106 causes electric motor 106 to drive fluid mover 104 to generate corresponding fluid-flows. The fluid-flow 112 generated by fluid mover 104 is at least partially a function of the motor speed of electric motor 106 and the fluid-flow restriction of output path 102. In some embodiments, electric motor 106 is integrated with fluid mover 104.

Alternatively, electric motor 106 is configured to operate at a plurality of speed output levels (i.e., speed-controlled) to increase or decrease a corresponding motor torque. As in the torque-controlled embodiments, increasing or decreasing the torque of electric motor 106 causes electric motor 106 to drive fluid mover 104 to generate corresponding fluid-flows.

System controller 110 and motor controller 108 are communicatively coupled to electric motor 106 to operate electric motor 106. More specifically, motor controller 108 supplies electrical power of a certain current amplitude, phase, and frequency to the stator windings of electric motor 106 to operate electric motor 106 according to instructions or commands from system controller 110. By adjusting the amplitude, phase, and frequency, motor controller 108 controls the torque (or alternatively speed in a speed-controlled embodiment) of the electric motor 106, thereby facilitating control of the speed of electric motor 106. In other embodiments, motor controller 108 may be communicatively coupled to a second controller (not shown) associated with electric motor 106. In such embodiments, motor controller 108 may be configured to transmit control signals to the second controller to instruct the second controller to operate electric motor 106. In such an embodiment, motor controller 108 may be separated, or remote, from electric motor 106. For example, motor controller 108 may be located within an HVAC assembly along with fluid mover 104 and electric motor 106. In another embodiment, for example, motor controller 108 may be located with a thermostat system or system controller 110.

Motor controller 108 includes a processor 114, a memory 116 communicatively coupled to processor 114, and a sensor system 118. Processor 114 is configured to execute instructions stored within memory 116 to cause motor controller 108 to function as described herein. For example, memory 116 is configured to store a constant fluid-flow algorithm to be executed by processor 114. Memory 116 is further configured to store a plurality of coefficient values for use in the constant fluid-flow algorithm. Moreover, memory 116 is configured to store data to facilitate calibrating electric motor 106. In some embodiments, motor controller 108 may include a plurality of processors 114 and/or memories 116. In other embodiments, memory 116 may be integrated with processor 114. In one example, memory 116 includes a plurality of data storage devices to store instructions and data as described herein. In alternative embodiments, an additional processor and memory may be incorporated into system controller 110 for the purpose of storing a constant fluid-flow algorithm and coefficient values, and for executing the constant fluid-flow algorithm for the purpose of controlling motor controller 108 to produce a demanded constant fluid-flow. Control system 101 is described herein as allocating the function of storing and executing the constant fluid-flow algorithm at motor controller 108, it should be understood that any processor and memory within control system 101 may carry out the functions of controlling fluid mover 104 to produce an approximately constant fluid-flow.

Prior to operation of motor controller 108 described herein, motor controller 108 receives values for coefficients that result from a regression analysis of characterization data for electric motor 106 and fluid mover 104. The coefficients correspond to programmable variables within the constant fluid-flow algorithm stored in memory on motor controller 108 and executable by processor 114 during operation. In certain embodiments, certain other constants for the constant fluid-flow algorithm, or alternative constant fluid-flow algorithms, may be defined and stored, for example, in memory 116, such as an EEPROM. In certain embodiments, the values for coefficients may be received from external system controller 110 or other device over a wired or wireless communication channel. In another alternative embodiment, the values for coefficients may be programmed into motor controller 108 by a technician or installer when motor controller 108 is installed.

During operation, motor controller 108 generally receives a fluid-flow rate demand (Q) from external system controller 110 and one of motor torque (T) and motor speed (N) measured at electric motor 106. The other of motor torque (T) and motor speed (N) is computed. For example, in a torque-controlled embodiment, system controller 110 transmits a fluid-flow rate demand (Q) to motor controller 108, and motor controller 108 computes a motor torque (T) to be commanded of electric motor 106 based on a measured motor speed (N). In an alternative embodiment, system controller 110 transmits a discrete selection, or an index, of a particular fluid-flow rate demand (Q) from among a plurality of values stored in a table in memory 116. Motor speed (N) may be determined from the current signal supplied to the stator windings or, alternatively, may be measured directly by sensor system 118. The torque control loop then recursively executes, or iterates, until motor torque (T) converges on an objective torque. The torque control loop may execute, for example, once every 100 milliseconds. In alternative embodiments, the torque control loop period may be lengthened or shortened depending on, for example, the specific electric motor, fluid mover, or output path configuration.

Likewise, in a speed-controlled embodiment, system controller 110 transmits a fluid-flow rate demand (Q) to motor controller 108, and motor controller 108 computes a motor speed (N) to be commanded of electric motor 106 based on a measured motor torque (T). As described above with respect to motor speed (N), motor torque (T) may be determined from the current signal supplied to the stator windings or, alternatively, may be measured directly by sensor system 118. The speed control loop then iterates until motor speed (N) converges on an objective speed.

Sensor system 118 includes one or more sensors that are configured to monitor electric motor 106. In certain embodiments, sensor system 118 is omitted and motor torque and speed are determined from the current signal supplied to the stator windings of electric motor 106. In one embodiment, sensor system 118 is configured to monitor a frequency output of motor controller 108 to electric motor 106. Sensor system 118 may monitor other data associated with electric motor 106, such as, but not limited to, motor speed, torque, power, and the like. In certain embodiments, sensor system 118 is configured to monitor a fluid-flow output of fluid mover 104. For example, sensor system 118 may include an air pressure sensor configured to monitor static pressure within output path 102, such as a duct or plenum. In some embodiments, sensor system 118 monitors electric motor 106 from motor controller 108. In such embodiments, sensor system 118 may be integrated with processor 114. In other embodiments, at least some sensors of sensor system 118 may be installed on electric motor 106 and transmit sensor data back to motor controller 108.

In one embodiment, motor controller 108 is configured to calibrate electric motor 106 for a plurality of fluid-flow output levels to determine corresponding pairs of torque and speed. The resulting fluid-flow-torque-speed data points define a surface that further defines the operating profile of constant fluid-flow system 100.

Motor controller 108 includes a drive circuit 120. Drive circuit 120 supplies electric power to the stator windings of electric motor 106 based on control signals received from processor 114. Drive circuit 120 may include, for example, various power electronics for conditioning line frequency alternating current (AC) power to be supplied to the stator windings of electric motor 106 with a desired current, i.e., phase, amplitude, and frequency. Such power electronics may include, for example, and without limitation, one or more rectifier stages, power factor correction (PFC) circuits, filters, transient protection circuits, EMF protection circuits, inverters, or power semiconductors.

Motor controller 108 includes a communication interface 122. Communications interface 122 may include one or more wired or wireless hardware interface, such as, for example, universal serial bus (USB), RS232 or other serial bus, CAN bus, Ethernet, near field communication (NFC), WiFi, Bluetooth, or any other suitable digital or analog interface for establishing one or more communication channels between system controller 110 and motor controller 108. For example, in certain embodiments, one or more parameters, such as a maximum fluid-flow rate (expressed in cubic feet per minute), fluid-flow rate demand, or one or more coefficient values, may be communicated to motor controller 108 through communications interface 122 using a pulse-width modulated signal. In certain embodiments, system controller 110 or another processor (not shown) may communicate operating parameters such as torque, speed, or power to motor controller 108 through communications interface 122. Communications interface 122 further includes a software or firmware interface for receiving one or more motor control parameters and writing them, for example, to memory 116. In certain embodiments, communication interface 122 includes, for example, a software application programming interface (API) for supplying one or more coefficient values for a constant fluid-flow algorithm. In such embodiments, received coefficient values are supplied to processor 114, processed, and stored in memory 116 along with a constant fluid-flow algorithm for subsequent execution by processor 114 during operation of electric motor 106.

In certain embodiments, memory 116 is configured to store two or more constant fluid-flow algorithms. Alternatively, memory 116 may be configured to store a single constant fluid-flow algorithm, and one or more sets of constants to be utilized by the algorithm. In certain embodiments, electric motor 106 and motor controller 108 are configured to receive through communication interface 122 and utilize those coefficients with the constant fluid-flow algorithm.

Figure 2:
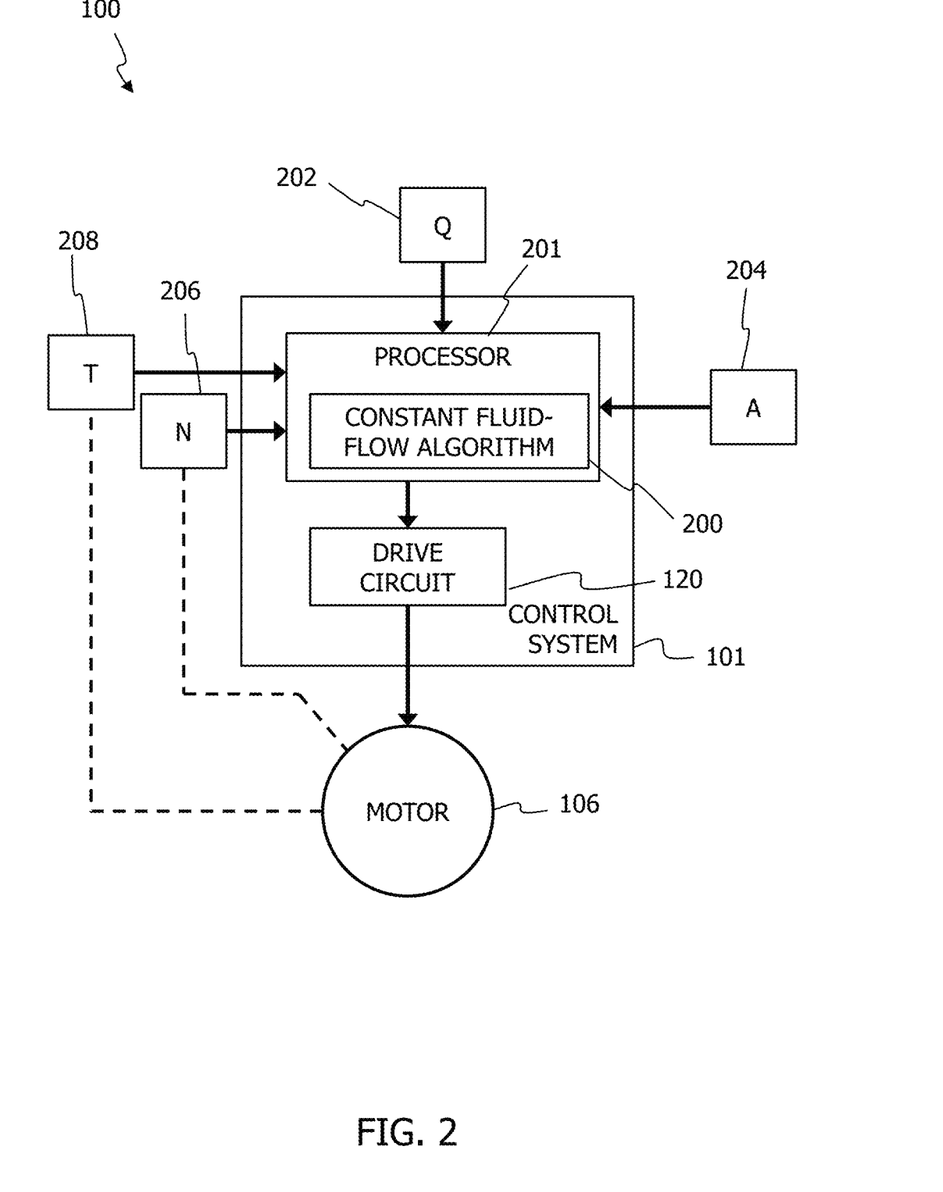
FIG. 2 is a logical block diagram of the constant fluid-flow system shown in FIG. 1.

FIG. 2 is a logical block diagram of constant fluid-flow system 100, including electric motor 106 and control system 101 (shown in FIG. 1). A processor 201 (e.g., processor 114 of motor controller 108, or a processor of system controller 110) transmits control signals to drive circuit 120 to control the current amplitude, phase, and frequency of the electric power supplied to electric motor 106. Processor 201 executes, for example, a constant fluid-flow algorithm 200, such as that described above in EQ. 1, EQ. 2, and EQ. 3 to compute one of a torque set point and a speed set point for controlling drive circuit 120 and electric motor 106. Execution of the algorithm is typically carried out periodically, e.g., at 10 Hertz, to update the torque set point or the speed set point. During operation, processor 201 receives a fluid-flow rate demand value, Q, 202 that is used in constant fluid-flow algorithm 200. Processor 201, in certain embodiments, may receive fluid-flow rate demand value, Q, 202, directly from a system controller, such as system controller 110 (shown in FIG. 1). Alternatively, system controller 110 may supply fluid-flow rate demand value, Q, 202 using discrete inputs representing an index into a table of fluid-flow rate demand values stored in a memory from which processor 201 receives fluid-flow rate demand value, Q, 202. Alternatively, system controller 110 may supply a pulse width modulated (PWM) signal that proportionately varies between two fluid-flow rate demand values. In yet another alternative embodiment, system controller 110 may supply a digital command including fluid-flow rate demand value, Q, 202.

Processor 201 also receives coefficient values, A, 204 that are used in constant fluid-flow algorithm 200. Coefficient values, A, 204 may be received, for example, from system controller 110, from a memory, such as memory 116 (shown in FIG. 1), or from another external device. In certain embodiments, processor 201 receives coefficient values, A, 204 when constant fluid-flow system 100 is, for example, manufactured, installed, or powered on, and processor 201 operates with those same values from that point on unless it is reset, reprogrammed, or recalibrated by a technician or other user. In other embodiments, processor 201 may receive a periodic update of coefficient values, A, 204 from a remote device and constant fluid-flow algorithm 200 utilizes the latest values for a given iteration.

In certain embodiments, constant fluid-flow algorithm 200 is selected from among multiple algorithms stored in memory, such as memory 116. The memory may include, for example, read-only memory such as an EEPROM. Constant fluid-flow algorithm 200 is retrieved from the memory based on a user selection or a selection by system controller 110. In turn, for example, system controller 110 then transmits corresponding coefficient values, A, 204, a corresponding memory address for the space in the memory containing the appropriate coefficient values, A, 204, or an identifier, or "pointer," to such a memory address to processor 201. Processor 201 then gains access to the corresponding space in the memory and reads coefficient values, A, 204.

Processor 201 receives at least one of a measured speed, N, 206 and a measured torque 208 of electric motor 106. That is used in constant fluid-flow algorithm 200. Measured speed, N, 206, for example, may be derived from a current signal supplied to the stator windings of electric motor 106. For example, such a current signal may be measured by a current sensor and measured speed, N, 206 is derived from that measurement. Alternatively, processor 201 may receive a frequency measurement from a frequency sensor on electric motor 106, the output of which may be converted to measured speed, N, 206. Alternatively, motor speed may be measured by any other suitable method, such as by further analyzing the current signal supplied to the stator windings of electric motor 106. Measured torque, T, 208, for example, may be derived from the current signal supplied to the stator windings of electric motor 106. For example, such a current signal may be measured by a current sensor and measured torque, T, 208 is derived from that measurement, e.g., by inference that torque output is equal to the commanded torque by virtue of a closed loop control system. Alternatively, processor 201 may receive a torque measurement from a torque sensor on electric motor 106 or, alternatively, by any other suitable method.

During operation, processor 201 executes constant fluid-flow algorithm 200 using the several inputs described above, including fluid-flow rate demand value, Q, 202, and at least one of measured speed, N, 206 and measured torque, T, 208. Upon execution of constant fluid-flow algorithm 200, processor 201 computes one of a torque set point and a speed set point that is used to control drive circuit 120. Drive circuit 120 then supplies the desired current and frequency of AC electric power to electric motor 106 to turn fluid mover 104 (shown in FIG. 1).

Figure 3:
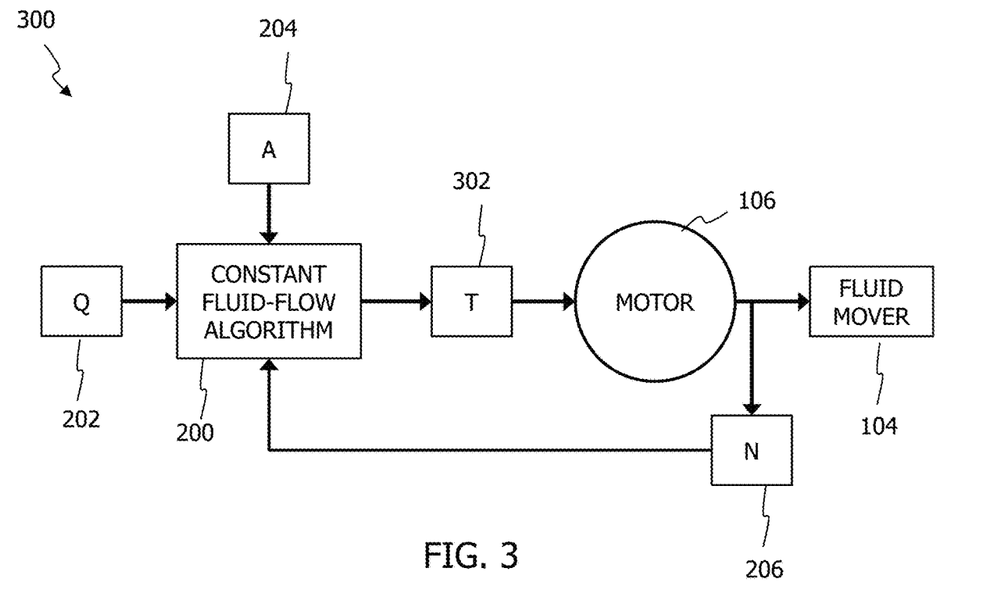
FIG. 3 is a schematic diagram of an exemplary constant fluid-flow control loop for a torque-controlled electric motor.

FIG. 3 is a schematic diagram of one embodiment of constant fluid-flow control loop 300 for use in controlling a torque-controlled electric motor, such as electric motor 106 of constant fluid-flow system 100 (shown in FIG. 1 and FIG. 2). Control loop 300 may be embodied, for example, in motor controller 108, processor 114, processor 201, or another processor in system controller 110 or other remote device, and illustrates control of electric motor 106 by execution of constant fluid-flow algorithm 200 to compute a torque set point 302. Constant fluid-flow algorithm 200 receives fluid-flow rate demand, Q, 202 and measured speed, N, 206, and computes torque set point 302 based on, for example, the formulas shown in EQ. 1, EQ. 2, and EQ. 3.

Figure 4:
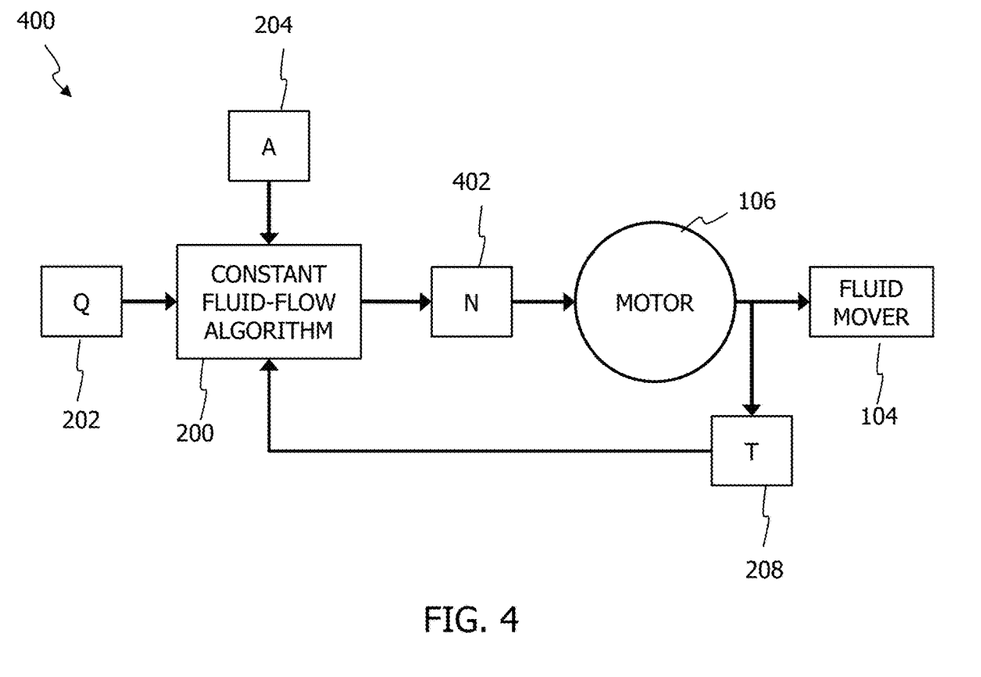
FIG. 4 is a schematic diagram of an exemplary constant fluid-flow control loop for a speed-controlled electric motor.

FIG. 4 is a schematic diagram of one embodiment of a constant fluid-flow control loop 400 for use in controlling a speed-controlled electric motor, such as electric motor 106 of constant fluid-flow system 100 (shown in FIG. 1 and FIG. 2). Control loop 400 may be embodied, for example, in motor controller 108, processor 114, processor 201, or another processor in system controller 110 or other remote device, and illustrates control of electric motor 106 by execution of constant fluid-flow algorithm 200 to compute a speed set point 402. Constant fluid-flow algorithm 200 receives fluid-flow rate demand, Q, 202 and measured torque, T, 208, and computes speed set point, N, 402 based on, for example, the formulas shown in EQ. 1, EQ. 2, and EQ. 3.

Figure 5:
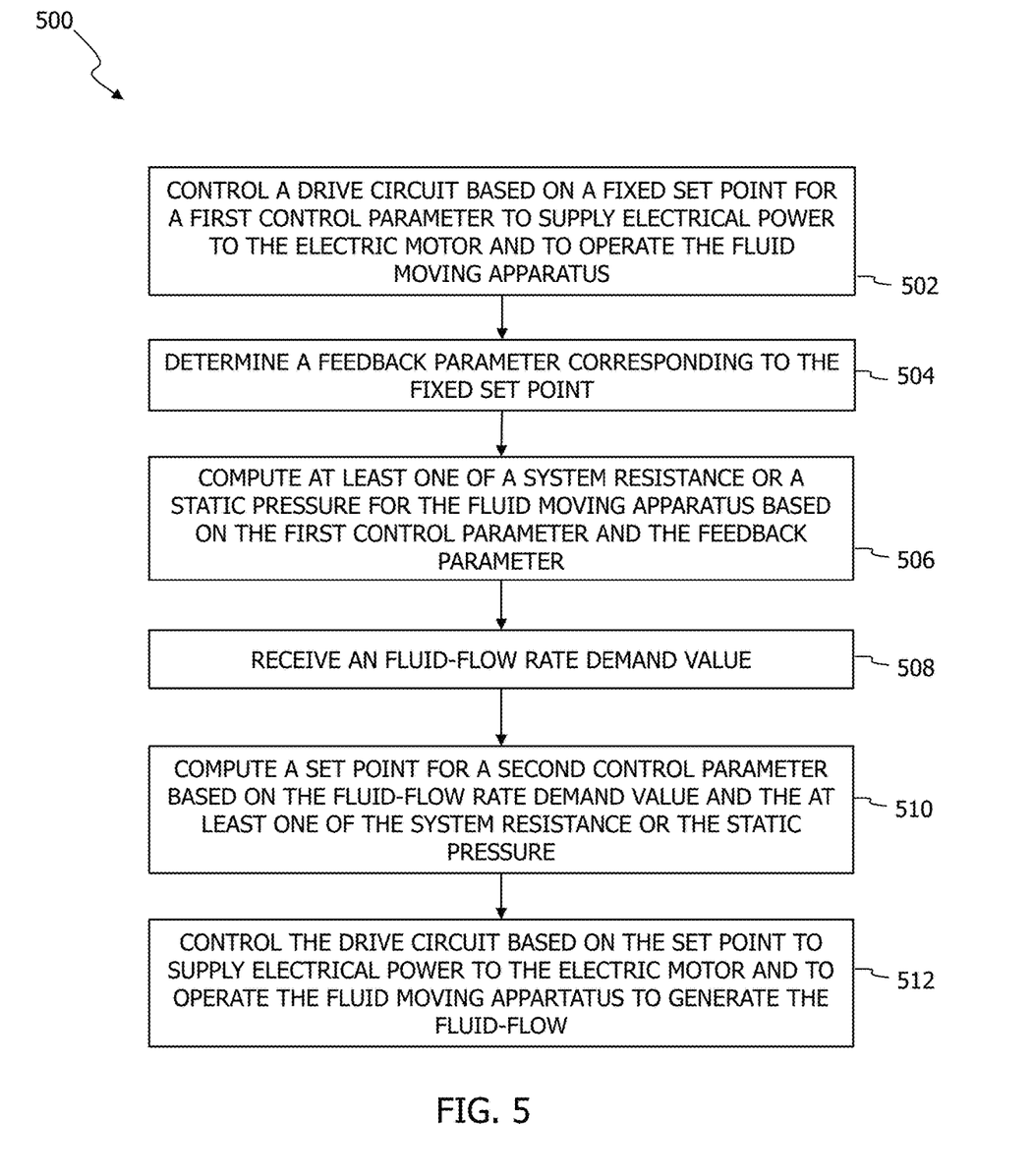
FIG. 5 is a flow diagram of an exemplary method of operating an electric motor configured to drive a blower to generate a fluid-flow into a duct.

FIG. 5 is a flow diagram of an embodiment of a method 500 of operating an electric motor configured to drive a fluid moving apparatus, or fluid mover, such as electric motor 106 and fluid mover 104 of constant fluid-flow system 100 (shown in FIG. 1). Fluid mover 104 then generates a fluid-flow into a space, such as output path 102. Referring to FIG. 1 and FIG. 5, method 500 may be embodied in a control system such as control system 101 having a processor, such as processor 114 of motor controller 108 or processor 201 of another device such as system controller 110 (all shown in FIG. 1 and FIG. 2).

Control system 101 controls 502 drive circuit 120 based on a fixed set point for a first control parameter to supply electrical power to electric motor 106 and to operate fluid mover 104. The first control parameter may be torque (T) output from electric motor 106. Alternatively, the first control parameter may be speed (N). Control system 101 determines 504 a feedback parameter corresponding to the fixed set point for the first control parameter. The feedback parameter may, in certain embodiments, be speed (N). In alternative embodiments, the feedback parameter may be torque (T). The first control parameter and the feedback parameter, in combination, include two of a speed (N), a torque (T), and power. For example, in one embodiment, the first control parameter is torque (T) and the feedback parameter is speed (N). In an alternative embodiment, the first parameter is speed (N) and the feedback parameter is torque (T). In another alternative embodiment, the first parameter is speed (N) and the feedback parameter is power.

Control system 101, in certain embodiments, determines a fluid-flow value corresponding to the torque (T) and speed (N). In certain embodiments, control system 101 may utilize a fluid-flow algorithm, such as that shown in EQ. 1, for example, to compute the fluid-flow value. The resulting torque-speed-fluid-flow data point may then be used to compute 506 at least one of a system resistance (R) or a static pressure (P), or a value proportional to at least one of the system resistance (R) or the static pressure (P), for output path 102 or for fluid mover 104. For example, in certain embodiments, the system resistance (R) is computed based on the fluid-flow value and the speed. Further, in certain embodiments, a static pressure (P) is first computed based on the fluid-flow value and torque or speed using a static pressure correlation, such as that shown in EQ. 3, and the system resistance (R) is then computed based on the fluid-flow value and the static pressure value (P). In certain embodiments, static pressure (P) is computed based on the fluid-flow value and the speed without computing or otherwise measuring system resistance (R).

During or before operation, control system 101 receives 508 a fluid-flow rate demand value (Q). This value may be received, for example, from remote system controller 110. The fluid-flow rate demand value may be transmitted as, for example, a digital formatted value or, alternatively, a continuous pulse-width modulated signal representing the desired fluid-flow rate demand (Q). An operating set point for a second control parameter is computed 510 based on at least one of the system resistance (R) or the static pressure (P) and the fluid-flow rate demand value (Q). The second control parameter, like the first control parameter, may be torque (T) or speed (N). The first and second control parameters are not necessarily the same. For example, the first control parameter, which is used to compute the initial system resistance (R) or the static pressure (P), may be torque (T), and the second control parameter may be speed (N). Alternatively, in certain embodiments, the first and second control parameters may both be torque (T) or may both be speed (N). The operating set point for the second control parameter is then used by control system 101 to control 512 drive circuit 120 to supply electrical power to electric motor 106 and to operate fluid mover 104 to generate the fluid-flow.

In certain embodiments, in computing the operating set point for the second control parameter, control system 101 is configured to translate the fluid-flow rate demand value (Q) to a static pressure value (P) using, for example, the relationship shown in EQ. 2. The static pressure value (P) and fluid-flow rate demand value (Q) are then used by control system 101 to compute, using EQ. 3 for example, a necessary speed (N) at which electric motor 106 should be operated to produce the fluid-flow. In alternative embodiments, control system 101 may utilize a formula, similar to and derivable from EQ. 3, to compute a necessary torque (T) at which electric motor 106 should be operated to produce the fluid-flow.

Over time, in certain embodiments, the system resistance (R) may shift, e.g., the system resistance may increase due to dust buildup on a filter or other pathway. Alternatively, the system resistance (R) may be deliberately changed by adjusting one or more dampers on the constant fluid-flow system. Under such circumstances, control system 101 is configured to detect, for example, a change in torque (T) resulting from the shift in system resistance. In response to the change in torque (T), control system 101 is configured to re-compute, using EQS. 1-3, for example, the system resistance (R) or static pressure (P) based on the resulting updated torque-speed-fluid-flow data point. Control system 101 is further configured to then compute a new set point for the second control parameter at which electric motor 106 should be operated. Control system 101 iterates these computations until the new system resistance (R) converges on the "actual" system resistance (R) and, likewise, the operating point stabilizes at a new torque (T) and speed (N).

Figure 6:
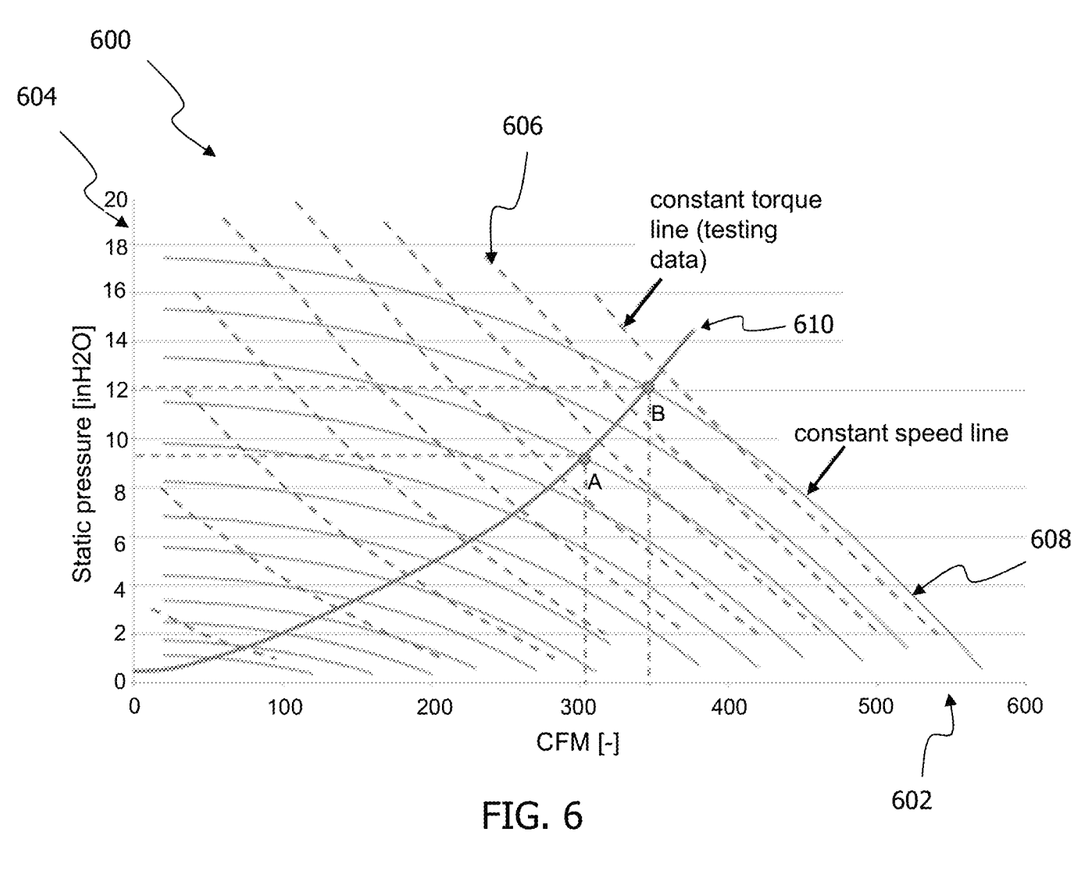
FIG. 6 is a plot of an example operating profile for a backward-curved blower.

FIG. 6 is a plot of an example operating profile 600, for example, for a backward-curved blower, compressor, impeller, or vane-axial fan. The plot illustrates demanded fluid-flow (Q), expressed in CFM, versus static pressure (P), expressed in inches of water (inH2O). A fluid-flow axis 602 extends horizontally and a static pressure axis 604 extends vertically. The plot includes various constant-torque lines 606 (shown as dashed lines), representing a series of fluid-flow-pressure pairs, i.e., pairs of demanded fluid-flow (Q) in CFM and static pressure (P) in inH2O, that produce an approximately constant torque output at the driveshaft of the motor. The plot includes various constant-speed lines 608 (shown as solid lines), representing a series of fluid-flow-pressure pairs that produce an approximately constant speed output from the motor. The plot includes a system resistance line 610 representing a series of fluid-flow-pressure operating points. For a given system resistance (R), system resistance line 610 illustrates a mathematical function for expressing static pressure (P) across the operating profile as a function of the demanded fluid-flow (Q). For example, when the demanded fluid-flow is at Q1, operating point A, on system resistance line 610, indicates a static pressure of P1 inH2O is demanded to produce the Q1 CFM fluid-flow. Likewise, if the demanded fluid-flow is increased to Q2 CFM, the operating point shifts along system resistance line 610 to an operating point B. At operating point B, system resistance line 610 indicates a static pressure of P2 inH2O is demanded to produce the Q2 CFM fluid-flow. In certain embodiments of a constant fluid-flow system, as the system resistance (R) shifts over time, system resistance line 610 shifts left (for increased resistance) or right (for decreased resistance).

The methods and systems described herein may be implemented using computer programming or engineering techniques including computer software, firmware, hardware or any combination or subset thereof, wherein the technical effect may include at least one of: (a) enabling use of a backward-curved blower, compressor, impeller, or certain types of fans, such as axial and vane-axial, in constant fluid-flow systems while maintaining the benefits provided by such fluid mover over, for example, forward-curved or radial equivalent blowers; (b) improving accuracy of estimations of actual fluid-flow for backward-curved blowers, compressors, impellers, and fans; (c) reducing fluid mover size and power consumption for a given range of fluid-flows in a constant fluid-flow system by use of, for example, a backward-curved blower versus a forward-curved or radial equivalent; (d) reducing fluid mover speed for a given range of fluid-flows in a constant fluid-flow system by use of, for example, a backward-curved blower versus a forward-curved or radial equivalent; and (e) improving thermal comfort and energy savings for operation of constant fluid-flow systems in HVAC systems.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for an electric motor installed at an installation location within a fluid-flow distribution system, the electric motor configured to drive a fluid-moving apparatus to generate a fluid-flow within the fluid-flow distribution system, said control system comprising: a drive circuit configured to regulate electrical power supplied to a stator of the electric motor to turn a rotor of the electric motor and generate the fluid-flow; and a processor coupled to said drive circuit and configured to: control said drive circuit based on a fixed set point for a first control parameter to supply the electrical power to the electric motor at the installation location and to operate the fluid-moving apparatus; determine a feedback parameter corresponding to the fixed set point of the first control parameter, the first control parameter and the feedback parameter, in combination, including two of a torque, a speed, or a power; determine a fluid-flow value corresponding to the fixed set point of the first control parameter and the feedback parameter; calculate a value proportional to at least one of a system resistance or a static pressure, the at least one of the system resistance or the static pressure associated with the fluid-moving apparatus, based on operating the fluid-moving apparatus within the fluid-flow distribution system according to the fixed set point for the first control parameter, the feedback parameter, and the fluid-flow value; receive a fluid-flow rate demand value for a demanded fluid flow; in response to receiving the fluid-flow rate demand value, during operation of the fluid-moving apparatus within the fluid-flow distribution system, calculate a static pressure demand value based on the fluid-flow rate demand value and the value proportional to the at least one of the system resistance or the static pressure; calculate an operating set point for a second control parameter based on the fluid-flow rate demand value and the static pressure demand value; and control said drive circuit based on the operating set point to supply the electrical power to the electric motor at the installation location and to operate the fluid-moving apparatus to generate the demanded fluid-flow within the fluid-flow distribution system.

2. The control system of claim 1, wherein the value proportional to at least one of the system resistance or the static pressure is a value proportional to the system resistance, and wherein said processor is further configured to: calculate the value proportional to the system resistance based on the fixed set point for the first control parameter and the feedback parameter by: calculating the static pressure associated with the fluid-moving apparatus based on the fluid-flow and the speed; and calculating the value proportional to the system resistance based on the static pressure and the fluid-flow.

3. The control system of claim 1, wherein the value proportional to at least one of the system resistance or the static pressure is a value proportional to the static pressure, and wherein said processor is further configured to calculate the value proportional to the static pressure using a static pressure correlation algorithm.

4. The control system of claim 1, wherein the first control parameter and the second control parameter are a same parameter.

5. The control system of claim 1, wherein the first control parameter is torque and the feedback parameter is speed.

6. The control system of claim 5, wherein the second control parameter is speed.

7. The control system of claim 5, wherein the second control parameter is torque.

8. The control system of claim 1, wherein the first control parameter is speed and the feedback parameter is an input power to the electric motor.

9. The control system of claim 1, wherein the first control parameter is a shaft power output from the electric motor or an input power to the electric motor, and the feedback parameter is speed or torque.

10. A method of operating an electric motor configured to drive a fluid-moving apparatus to generate a fluid-flow, said method comprising: installing the electric motor at an installation location within a fluid-flow distribution system; after said installing step, controlling a drive circuit based on a fixed set point for a first control parameter to supply electrical power to the electric motor and to operate the fluid-moving apparatus; determining a feedback parameter corresponding to the fixed set point of the first control parameter, the first control parameter and the feedback parameter, in combination, including two of a torque, a speed, or a power; determining a fluid-flow value corresponding to the fixed set point of the first control parameter and the feedback parameter; calculating a value proportional to at least one of a system resistance or a static pressure, the at least one of the system resistance or the static pressure associated with the fluid-moving apparatus, based on operating the fluid-moving apparatus within the fluid-flow distribution system according to the fixed set point for the first control parameter, the feedback parameter, and the fluid-flow value; receiving a fluid-flow rate demand value for a demanded fluid-flow; in response to receiving the fluid-flow rate demand value, during operation of the fluid-moving apparatus within the fluid-flow distribution system, calculating a static pressure demand value based on the fluid-flow rate demand value and the value proportional to the at least one of the system resistance or the static pressure; calculating an operating set point for a second control parameter based on the fluid-flow rate demand value and the static pressure demand value; and controlling the drive circuit based on the operating set point to supply the electrical power to the electric motor and to operate the fluid-moving apparatus to generate the demanded fluid-flow within the fluid-flow distribution system.

11. The method of claim 10, wherein the value proportional to at least one of the system resistance or the static pressure is a value proportional to the system resistance, and wherein calculating the value proportional to the at least one of the system resistance or the static pressure includes: calculating the static pressure associated with the fluid-moving apparatus based on the fluid-flow value and the feedback parameter; and calculating the value proportional to the system resistance based on the static pressure and the fluid-flow.

12. The method of claim 11, wherein the value proportional to at least one of the system resistance or the static pressure is a value proportional to the static pressure, and wherein calculating the value proportional to the static pressure comprises using a static pressure correlation algorithm.

13. The method of claim 10, wherein the first control parameter and the second control parameter are a same parameter.

14. The method of claim 10, wherein the first control parameter is torque and the feedback parameter is speed.

15. The method of claim 10, wherein the second control parameter is speed.

16. The method of claim 10, wherein the second control parameter is torque.

17. The method of claim 10, wherein the first control parameter is speed and the feedback parameter is torque.

18. The method of claim 10, wherein the first control parameter is a shaft power output from the electric motor or an input power to the electric motor, and the feedback parameter is speed or torque.

19. A constant fluid-flow system, comprising: a fluid moving apparatus; an electric motor installed at an installation location within a fluid-flow distribution system, said electric motor coupled to and configured to drive said fluid moving apparatus to generate a fluid-flow within the fluid-flow distribution system, said electric motor comprising a stator and a rotor coupled to said fluid moving apparatus; a control system comprising a drive circuit configured to regulate electrical power supplied to said stator to turn said rotor and said fluid moving apparatus to generate the fluid-flow, and a processor configured to: control said drive circuit based on a fixed set point for a first control parameter to supply the electrical power to the electric motor and to operate said fluid moving apparatus; determine a feedback parameter corresponding to the fixed set point of the first control parameter, the first control parameter and the feedback parameter, in combination, including two of a torque, a speed, or a power; determine a fluid-flow value corresponding to the fixed set point of the first control parameter and the feedback parameter; calculate a value proportional to at least one of a system resistance or a static pressure, the at least one of the system resistance or the static pressure associated with the fluid moving apparatus, based on operating the fluid moving apparatus within the fluid-flow distribution system according to the fixed set point for the first control parameter, the feedback parameter, and the fluid-flow value; receive a fluid-flow rate demand value for a demanded fluid-flow; in response to receiving the fluid-flow rate demand value, during operation of said fluid-moving apparatus within the fluid-flow distribution system, calculate a static pressure demand value based on the fluid-flow rate demand value and the value proportional to the at least one of the system resistance or the static pressure; calculate an operating set point for a control parameter based on the fluid-flow rate demand value and the static pressure demand value; and control said drive circuit based on the operating set point to supply the electrical power to said electric motor and to operate said fluid moving apparatus to generate the demanded fluid-flow within the fluid-flow distribution system.

* * * * *